US012728518B2

(12) United States Patent
Wang

(10) Patent No.: US 12,728,518 B2
(45) Date of Patent: Sep. 8, 2026

(54) TOOL HOLDER

(71) Applicant: Stanley Black & Decker MEA FZE, Dubai (AE)

(72) Inventor: Tseng Sheng Wang, Taichung City (TW)

(73) Assignee: STANLEY BLACK & DECKER MEA FZE, Dubai (AE)

( * ) Notice: Subject to any disclaimer, the term of this patent is extended or adjusted under 35 U.S.C. 154(b) by 0 days.

(21) Appl. No.: 18/951,128

(22) Filed: Nov. 18, 2024

(65) Prior Publication Data

US 2026/0138261 A1 May 21, 2026

(51) Int. Cl.
*B25H 3/00* (2006.01)

(52) U.S. Cl.
CPC .................................... *B25H 3/003* (2013.01)

(58) Field of Classification Search
CPC ..................................................... B25H 3/003
USPC ................................ 206/377, 378, 376, 366
See application file for complete search history.

(56) References Cited

U.S. PATENT DOCUMENTS 7,331,455 B2 2/2008 Lin
8,950,597 B2 * 2/2015 Lin ........................ B25H 3/003 211/70.6
9,919,415 B1 * 3/2018 Su .......................... B25H 3/003
10,723,014 B2 7/2020 Gallegos
2003/0015444 A1 * 1/2003 Molin ................. A61M 5/3205 211/60.1
2007/0235360 A1 * 10/2007 Lin ........................ B25H 3/025 206/373
2008/0202963 A1 8/2008 Liao
2011/0071475 A1 * 3/2011 Horvath .............. A61M 5/3213 604/192
2013/0306508 A1 * 11/2013 Gallegos ................ B25H 3/003 53/474
2015/0306760 A1 * 10/2015 Meng ..................... B25H 3/003 206/377
2018/0281170 A1 10/2018 Tsai
2023/0405797 A1 * 12/2023 Wei ........................ B25H 3/003

FOREIGN PATENT DOCUMENTS

DE 202004004036 U1 5/2004

OTHER PUBLICATIONS

Extended European Search Report for EP25215416.6 dated Apr. 16, 2026.

* cited by examiner

*Primary Examiner* — Jacob K Ackun
(74) *Attorney, Agent, or Firm* — Jordan IP Law, LLC; Todd A. Vaughn

(57) ABSTRACT

A tool holder for storing and organizing tools such as hexagonal ("hex") wrenches. The tool holder has first and second modules each having at least one tool cavity configured to receive and hold tools in place until a user applies pressure to remove the tools. A position-control mechanism is located at an interface between the modules, the position-control mechanism including a protrusion on a side of one module that is disposed in a mating cavity in a side of the other module, where the mating cavity is shaped such that the protrusion may move within the mating cavity, allowing the a module to rotate independently from the other module.

17 Claims, 9 Drawing Sheets

TOOL HOLDER

BACKGROUND

1. Technical Field

The present disclosure relates to a holder for storing and organizing tools such as hexagonal ("hex") wrenches.

2. Introduction

Hex keys, commonly known as Allen keys/wrenches or hex key wrenches, are hand tools of the general spanner and socket family, used for tightening and loosening hexagonal bolts and other compatible fasteners. In some cases, a hex key can have a TORX screw drive, with a star-shaped drive. In general, a hex key is made of a single piece of hexagonal-shaped metal with a single 90° bend at approximately ⅓ the length of the metal, resulting in a short arm and a long arm.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A tool holder for performing the concepts disclosed herein can include: a first module defining at least one tool cavity configured to receive and hold a first tool positioned in a first direction until a user applies pressure to remove the first tool; a second module also defining at least one tool cavity configured to receive and hold a second tool positioned in the first direction until the user applies pressure to remove the second tool; and a position-control mechanism disposed at an interface between the first module and the second module, the position-control mechanism comprising: a protrusion on a side of the first module that is disposed in a mating cavity defined in a side of the second module adjacent thereto, wherein the mating cavity is shaped such that the protrusion may move within the mating cavity allowing the first module to rotate independently from the second module such that a tool disposed in the at least one tool cavity of the first module may be positioned in a second direction different than the first direction.

A tool holder configured to perform the concepts disclosed herein can include: a first module defining at least one tool cavity configured to receive and hold a first tool positioned in a first direction until a user applies pressure to remove the first tool; a second module also defining at least one tool cavity configured to receive and hold a second tool positioned in the first direction until the user applies pressure to remove the second tool; and a position-control mechanism disposed at an interface between the first module and the second module, the position-control mechanism comprising: a circular protrusion on a side of the first module that is disposed in a mating cavity defined in a side of the second module adjacent thereto, wherein the mating cavity is an elliptical-like cavity shaped such that the circular protrusion may move within the mating cavity allowing the first module to rotate independently from the second module such that a tool disposed in the at least one tool cavity of the first module may be positioned in a second direction different than the first direction.

A tool holder configured to perform the concepts disclosed herein can include: a first module defining at least one tool cavity configured to receive and hold a first tool positioned in a first direction until a user applies pressure to remove the first tool; a second module also defining at least one tool cavity configured to receive and hold a second tool positioned in the first direction until the user applies pressure to remove the second tool; a third module also defining at least one tool cavity configured to receive and hold a third tool positioned in the first direction until the user applies pressure to remove the third tool, the first module, the second module, and the third module being connected via position-control mechanisms disposed at an interface between each module and a neighboring module, the position-control mechanisms comprising: a protrusion on a side of the each module that is disposed in a mating cavity defined in a side of the neighboring module adjacent thereto, wherein the mating cavity is shaped such that the protrusion may move within the mating cavity allowing the each module to rotate independently from the neighboring module such that a tool disposed in the at least one tool cavity of the each module may be positioned in a second direction different than the first direction.

DETAILED DESCRIPTION

Figure 1:
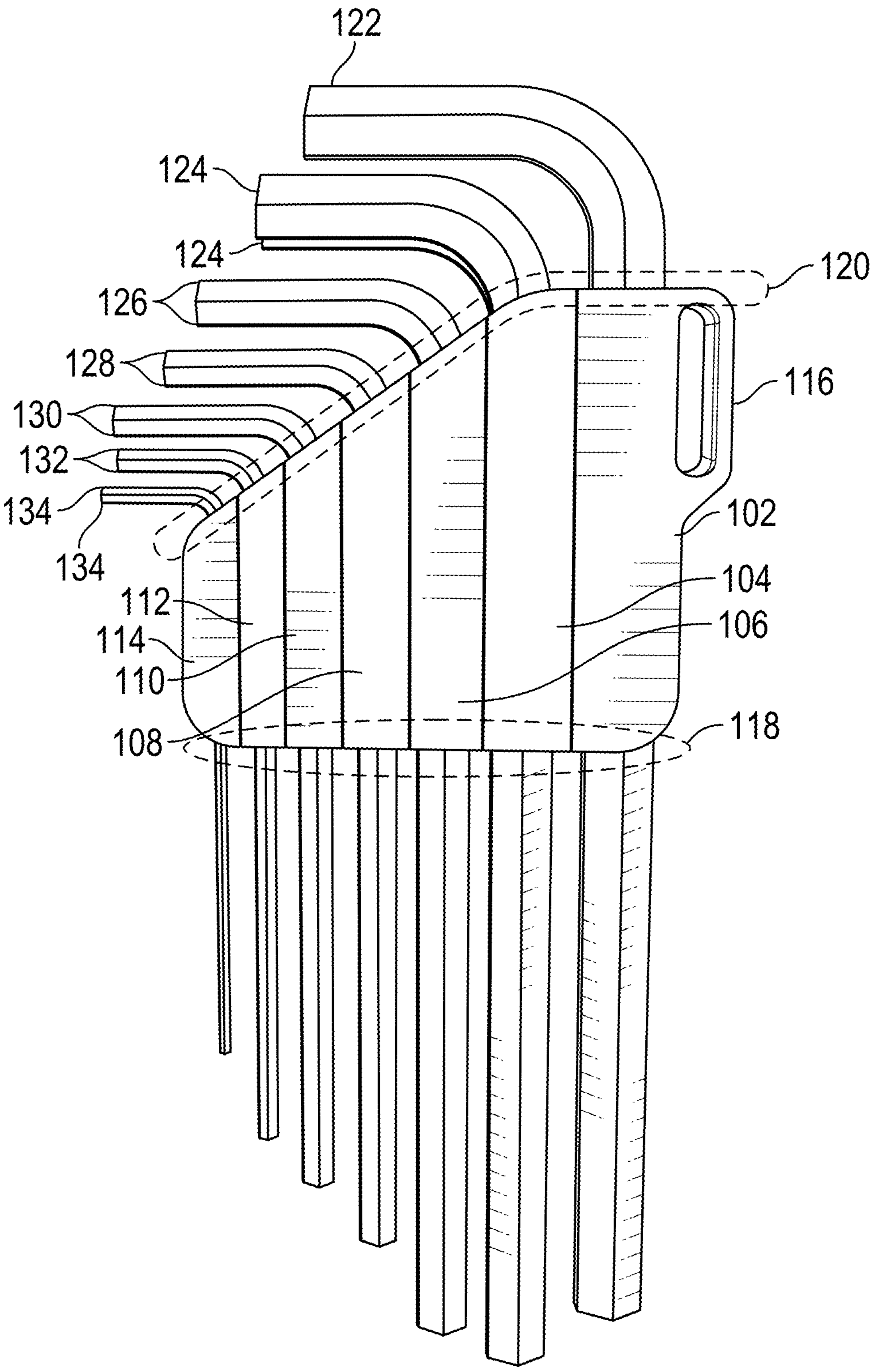
FIG. 1 illustrates an example of a tool holder from a first side view.

Various embodiments of the disclosure are described in detail below. While specific implementations are described, this is done for illustration purposes only. Other components and configurations may be used without parting from the spirit and scope of the disclosure.

Holders for tools such as hex keys come in a variety of shapes. For example, in some the holder can open like a book, allowing a user to select among the available hex keys. Another holder may operate similar to a SWISS ARMY pocketknife, with each hex key individually spinning from a common axis (i.e., pivot point). However, such holders their respective problems. For example, with a book-type holder, the individual hex keys are often held in place using plastic pinchers, which over time fail to grip the hex keys, such that when the user opens the book the keys fall out.

Likewise, with a SWISS ARMY-style hex keys may rotate unintentionally, obfuscating the user's ability to use the desired hex key.

Tool holders configured as disclosed herein overcome these issues by having a plurality of modules connected, each module holding one or more tools. The modules are connected together using (1) a bolt, which is fed through all of the modules, terminating in a nut; and (2) protruded circles of modules engaging with elliptical-like cavities on neighboring modules, where the elliptical-like cavities have notches which help hold the protruded circles in place. When the protruded circle of one module engages with the elliptical-like cavity of a neighboring module, the protruded circle and elliptical-like cavity together form a position control mechanism. This position control mechanism is located at an interface between the neighboring modules (i.e., the interface being the portions of the modules in physical contact one with another). While a circular protrusion and elliptical like cavity are preferable, those skilled in the art will recognize that the position control mechanism could include a protrusion of any shape disposed in a correspondingly shaped mating cavity. For example, in an unshown embodiment, the protrusion may be cubic and disposed in an arcuate cavity. When a user wants to use a particular tool, the user can turn the module holding that tool with respect to one or more neighboring modules. This turning of the module causes the module to rotate around the bolt, while also causing the protruded circle to move from a first location to a second location within the elliptical-like cavity. In this manner, the module holding the desired tool is moved such that the tool's removal is no longer obstructed by a neighboring/proximate tool, and the module is held into that open position by a protruded circle engaging with a notch of the elliptical-like cavity. At that point, the user can apply pressure and remove the desired tool from the module, pulling the desired tool from a tool hole configured to hold a tool in place until a user applies pressure. The tools are pressed fit into the respective modules. Once the user is done using the tool, the user may insert the tool back into the tool hole in the module, then turn the module back to its original location.

The modules are arranged in order of size, with the larger modules configured to hold larger sized tools and the smaller modules configured to hold smaller sized tools. In some configurations the modules may hold only a single tool, whereas in other configurations the modules may hold two or more tools. Preferably, the largest module will be configured to hold a single tool (the largest held by the holder), while the other modules are each configured to hold two tools.

The number of modules within the holder can vary as needed. For example, in some configurations, the number of modules will be two or three. Preferably however the number of modules is sufficient for a user to have a full set of tools, hex keys or otherwise. In a preferred configuration, the number of modules is seven, with the largest module holding a single tool, such that the total number of tools in the holder being thirteen (6 modules with 2 tools each, and a $7^{th}$/largest module containing a single tool).

The modules and their tool holes are configured such that, when aligned, the tools are located directly under a larger tool. This aligned configuration is referred to as a "retaining" configuration because the tools are held in place by the pressure of the holder and are unable to be extracted due to a larger tool being above them (the exception being the largest tool). To free a tool, the user turns the module holding the desired tool ("desired module") with respect to the module immediately above the desired module, thereby allowing the tools contained within the desired module sufficient space to be removed.

The shape of the elliptical cavity controls the angle to which a module can turn. The more oblong a lobe of the elliptical cavity, the further the protrusion can travel therein. Thereby allowing the angle to range from 0 degrees to 90 degrees. The precise angle to which the desired module can turn can depend on factors such as the size of the protrusion and the elliptical-like cavity in which the protrusion engages, the size of the notch in the elliptical-like cavity, the distance between the protrusion and the bolt coupling the modules together, the number of modules, etc. In a preferred configuration, the angle between modules once a module is turned is approximately 45°. The true function of the notch is to keep the circular protrusion in the desired lobe of the elliptical cavity. Without the notch, the protrusion would move freely from one side of the elliptical cavity to the other. Thus, the tip of the notch needs to extend deep enough into the elliptical cavity to maintain the protrusion on the desired side of the notch, but not so far that the protrusion cannot be press fit over the notch to the opposite side of the elliptical-like cavity.

The elliptical-like cavity of smaller modules engages with the circular protrusion of proximate, larger modules. That is, preferably all modules but the largest module have an elliptical-like cavity, and all modules but the smallest module have a circular protrusion. In other configurations, the larger modules may contain the elliptical-like cavity and the smaller modules may have circular protrusions. When the holder is in a retaining configuration (i.e., the modules are aligned such that the tools stay in position), the circular protrusion of the modules engages with the elliptical-like cavity, holding the circular protrusion on a first side of a notch within the elliptical-like cavity. When the user turns a module, changing the module into a "release" configuration (i.e., moving the module such that the user can pull one of the tools loose), the turning causes the circular protrusion to move to the second side of the notch.

The notch can be located along one of the sides of the elliptical-like cavity. More specifically, the elliptical-like cavity has vertices along a major axis of the elliptical-like cavity, a single co-vertex along a minor axis a minor axis of the elliptical-like cavity, and the notch extending into the elliptical-like cavity along the minor axis in place of an additional co-vertex. In order for the turning of modules operate correctly, the notch should be located as close as possible to the bolt hole, such that when the user turns the module around the bolt hole, the user can turn the protrusion "over" the notch, locking the module into place in its new location.

Regarding the shape of the overall holder (which is formed from the individual modules being coupled together), preferably the modules have a common lower edge when in a retaining configuration. To accommodate the tools of different sizes, the holder can have an angled edge through which the tools are pushed (for insertion) or pulled (for release). The holder can also have sufficient room for the bolt to pass, through bolt holes, through all of the individual modules. Finally, the largest module can have a loop, or handle. The loop can, in some configurations, be sufficiently large for a belt, hook, or other attachment mechanism, the couple to the holder.

FIG. 1 illustrates an example of the tool holder from a first side view. In this example, the holder is illustrated as a combination of modules 102, 104, 106, 108, 110, 112, 114. The modules 102, 104, 106, 108, 110, 112, 114 have a common lower edge 118, while the top edge 120 is angled to accommodate the tools 122, 124, 126, 128, 130, 132, 134. The largest module 102 has a loop 116, or handle, formed as part of the module. Because the modules 102, 104, 106, 108, 110, 112, 114 are aligned (i.e., none are turned in this example), the holder is in a retention configuration.

Figure 2:
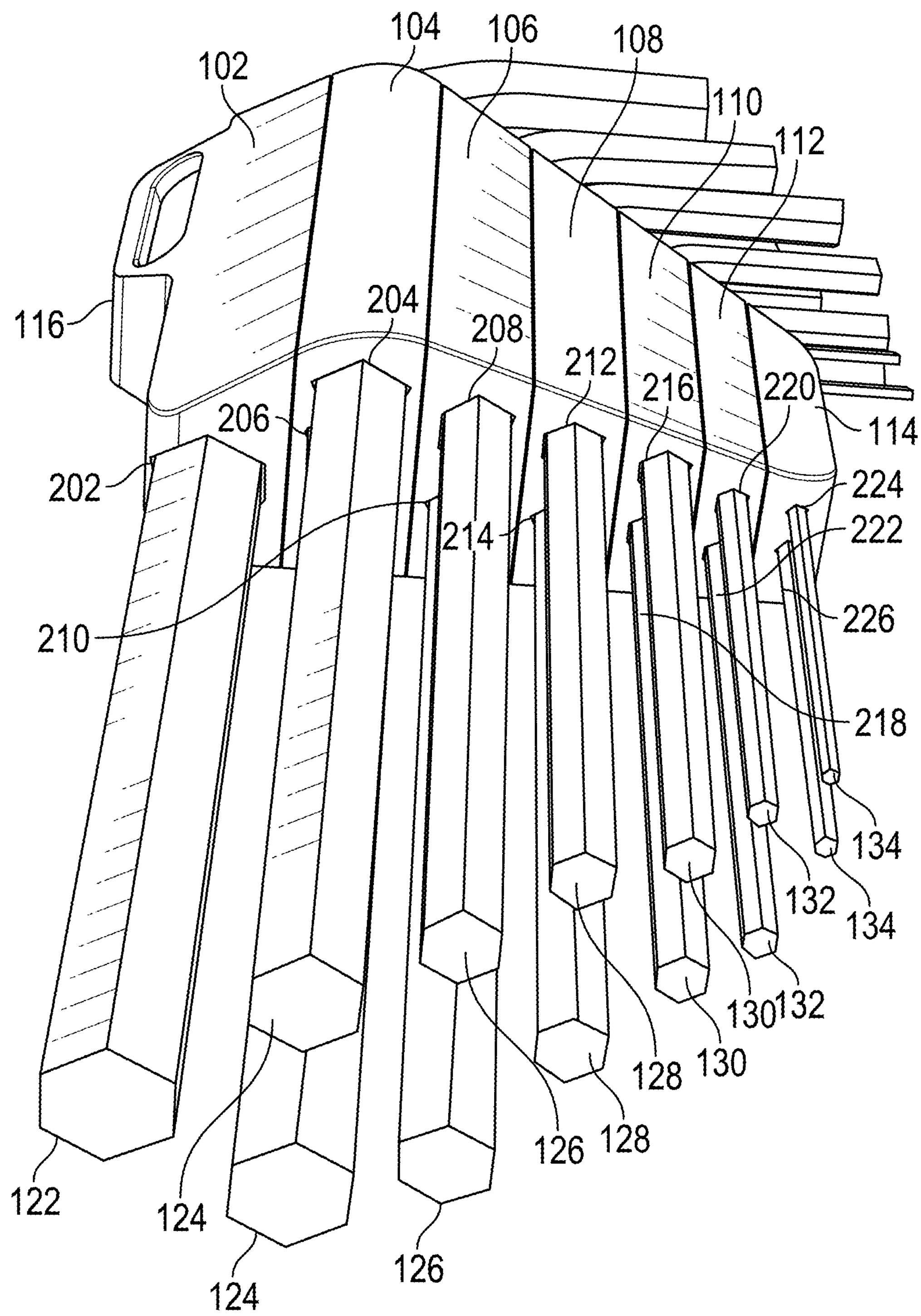
FIG. 2 illustrates an example of the tool holder from a bottom view.

FIG. 2 illustrates an example of the tool holder from a bottom view. This example illustrates that, in some configurations, the modules 102, 104, 106, 108, 110, 112, 114 can hold one or more tools. For example, in this example, the largest module 102 has a single tool 122 being held in place by a single tool hole 202. The next largest module 104 has two tools 124 being held in place by two tool holes 204, 206. This pattern continues through the other modules—module 106 has two tools 126 held in place by two tool holes 208, 210; module 108 has two tools 128 held in place by two tool holes 212, 214; module 110 has two tools 130 held in place by two tool holes 216, 218; module 112 has two tools 132 held in place by two tool holes 220, 222; and module 114 has two tools 134 held in place by two tool holes 224, 226. In some configurations, where two tools are assigned to a common module, they can be the same size. However, preferably, the two tools assigned to a common module will be of different sizes (e.g., one a common module one tool will be a 10 mm tool and the other tool will be a 9 mm tool).

Figure 3:
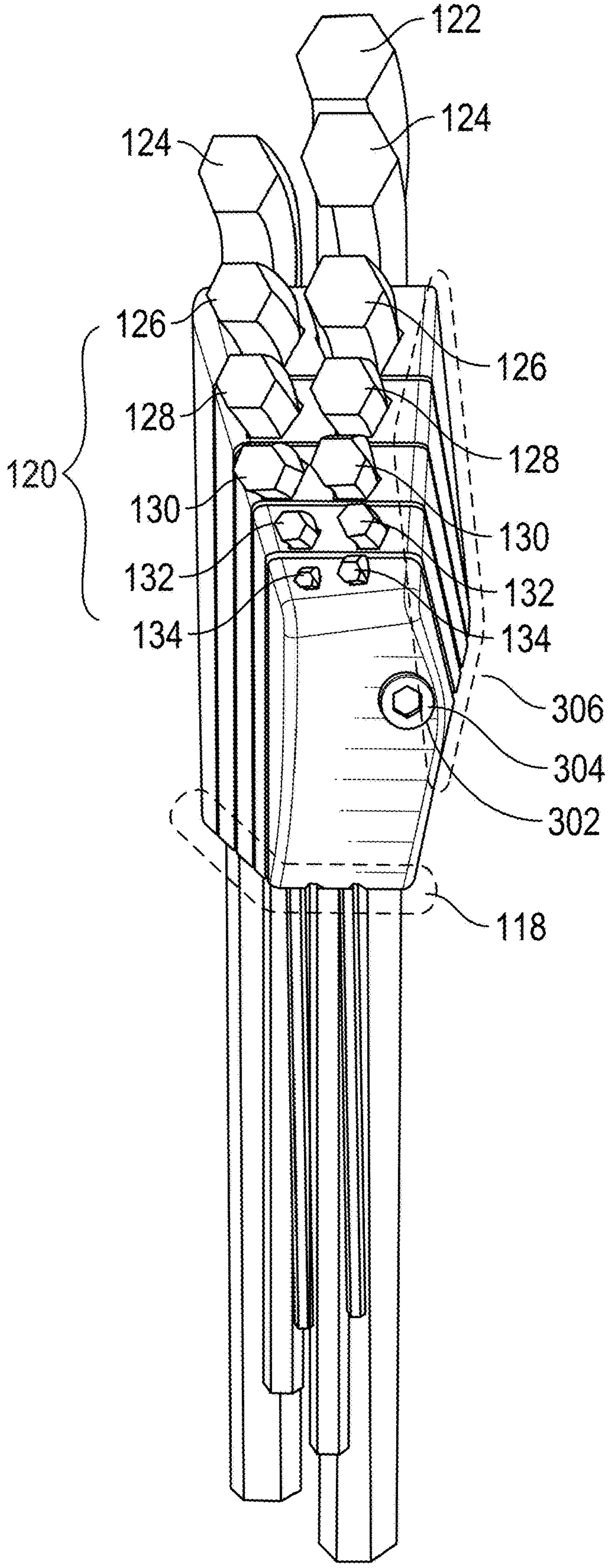
FIG. 3 illustrates an example of the tool holder from a second side view.

FIG. 3 illustrates an example of the tool holder from a second side view. From this view one can see the bolt 304 extending through a bolt hole 302. To accommodate the bolt 304 and bolt hole 302, the modules 102, 104, 106, 108, 110, 112, 114 can extend at an angle 306 away from the tools 122, 124, 126, 128, 130, 132, 134.

Figure 4:
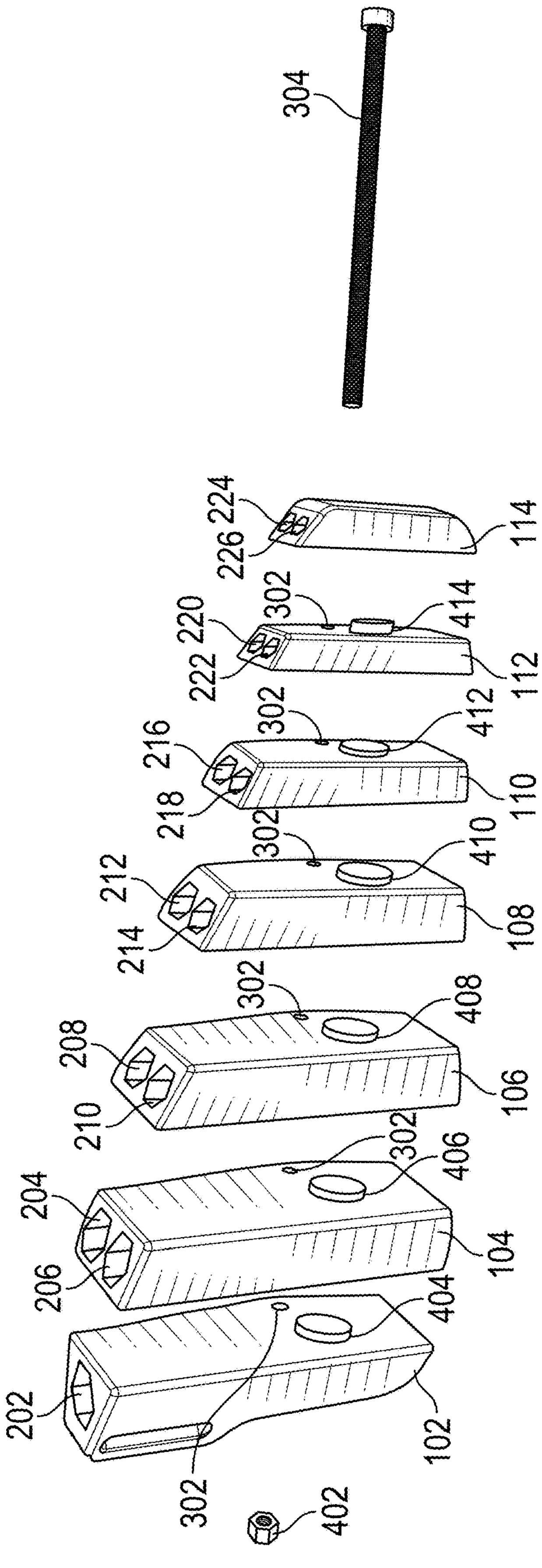
FIG. 4 illustrates a first example of the tool holder exploded into distinct holding modules.

FIG. 4 illustrates a first example of the tool holder exploded into distinct holding modules 102, 104, 106, 108, 110, 112, 114. As illustrated, each module 102, 104, 106, 108, 110, 112, 114 contains a bolt hole 302 through which the bolt 304 can extend. Upon inserting the bolt 304 through the bolt hole 302, the modules 102, 104, 106, 108, 110, 112, 114 become coupled, with a nut 402 (or other fastener) securing the bolt 304 in place. In this example, because the perspective illustrates the "small" side of the modules 102, 104, 106, 108, 110, 112, 114 (i.e., the side of the modules facing the smallest module 114), all modules 102, 104, 106, 108, 110, 112 but the smallest module 114 also have a circular protrusion 404, 406, 408, 410, 412, 414. The circular protrusions 404, 406, 408, 410, 412, 414 are located next to the bolt hole 302 on each module 102, 104, 106, 108, 110, 112, and assist in holding the modules 102, 104, 106, 108, 110, 112, 114 in place when rotating the modules 102, 104, 106, 108, 110, 112, 114.

Figure 5:
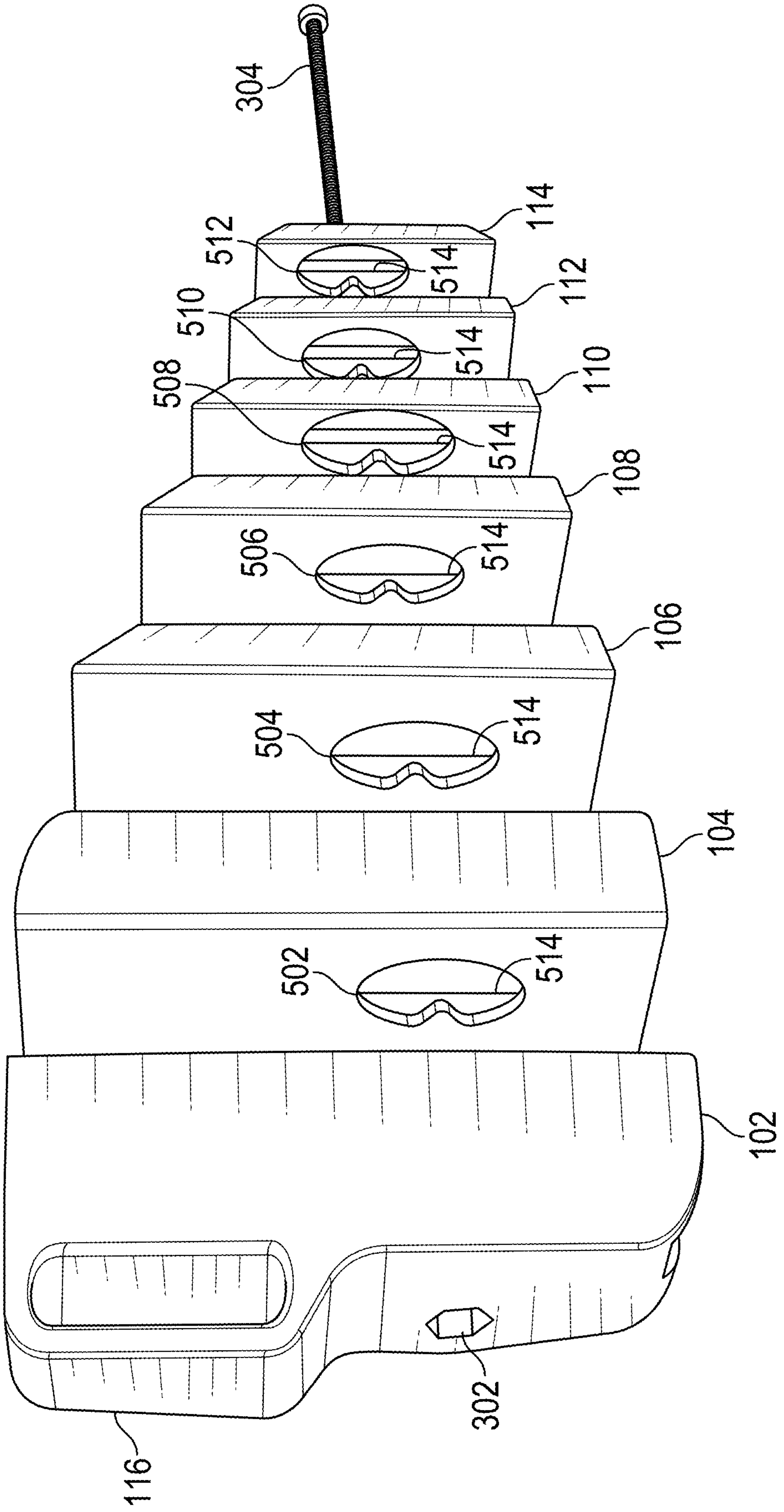
FIG. 5 illustrates a second example of the tool holder exploded into distinct holding modules.

FIG. 5 illustrates a second example of the tool holder exploded into distinct holding modules 102, 104, 106, 108, 110, 112, 114. The perspective of FIG. 5 allows visualization of the opposite side of the modules 102, 104, 106, 108, 110, 112, 114 (i.e., the "large" side facing the largest module 102). As illustrates, each module 104, 106, 108, 110, 112, 114 but the largest module 102 has an elliptical-like cavity 502, 504, 506, 508, 510, 512, each elliptical-like cavity 502, 504, 506, 508, 510, 512 having a notch 514.

The elliptical-like cavity 502, 504, 506, 508, 510, 512 of modules 104, 106, 108, 110, 112, 114 engage with the circular protrusions 404, 406, 408, 410, 412, 414 illustrated in FIG. 4. Thus the circular protrusion 404 of module 102 engages with the elliptical-like cavity 502 of module 104; the circular protrusion 406 of module 104 engages with the elliptical-like cavity 504 of module 106; the circular protrusion 408 of module 106 engages with the elliptical-like cavity 506 of module 108; the circular protrusion 410 of module 108 engages with the elliptical-like cavity 508 of module 110; the circular protrusion 412 of module 110 engages with the elliptical-like cavity 510 of module 112; and the circular protrusion 414 of module 112 engages with the elliptical-like cavity 512 of module 114.

Figure 6:
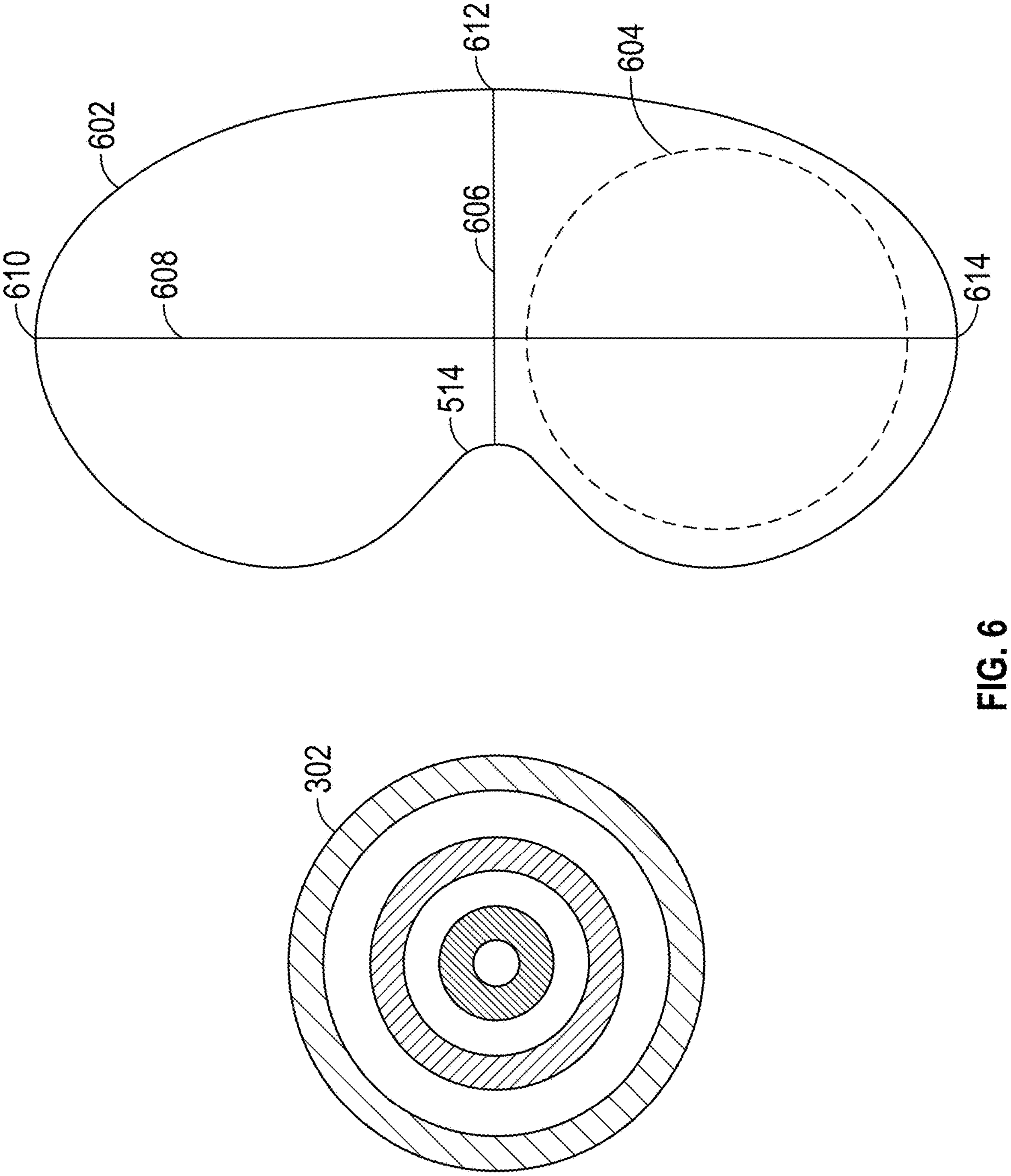
FIG. 6 illustrates an example of an elliptical-like cavity and a hole for a connecting bolt.

FIG. 6 illustrates an example of an elliptical-like cavity 602 and a bolt hole 302 for a connecting bolt. As illustrated, the bolt hole 302 shows layers corresponding to additional modules through which the bolt 304 passes. The elliptical-like cavity 602 has vertices 610, 614 along a major axis 608 of the elliptical-like cavity 602, a single co-vertex 612 along a minor axis 606 of the elliptical-like cavity 602, and a notch 514 extending into the elliptical-like cavity along the minor axis 606 in place of an additional co-vertex.

The circular protrusion 604 of a neighboring (i.e., immediately proximate) module fits within the elliptical-like cavity 602, holding the module(s) in place using friction against the circular protrusion 604 from the notch 514 and the edge of the elliptical-like cavity 602. When the user applies torque, thereby turning a module, the circular protrusion 604 can move from one side of the notch 514 to the other (i.e., the circular protrusion 604 will be cantilevered over the notch 514).

Figure 7:
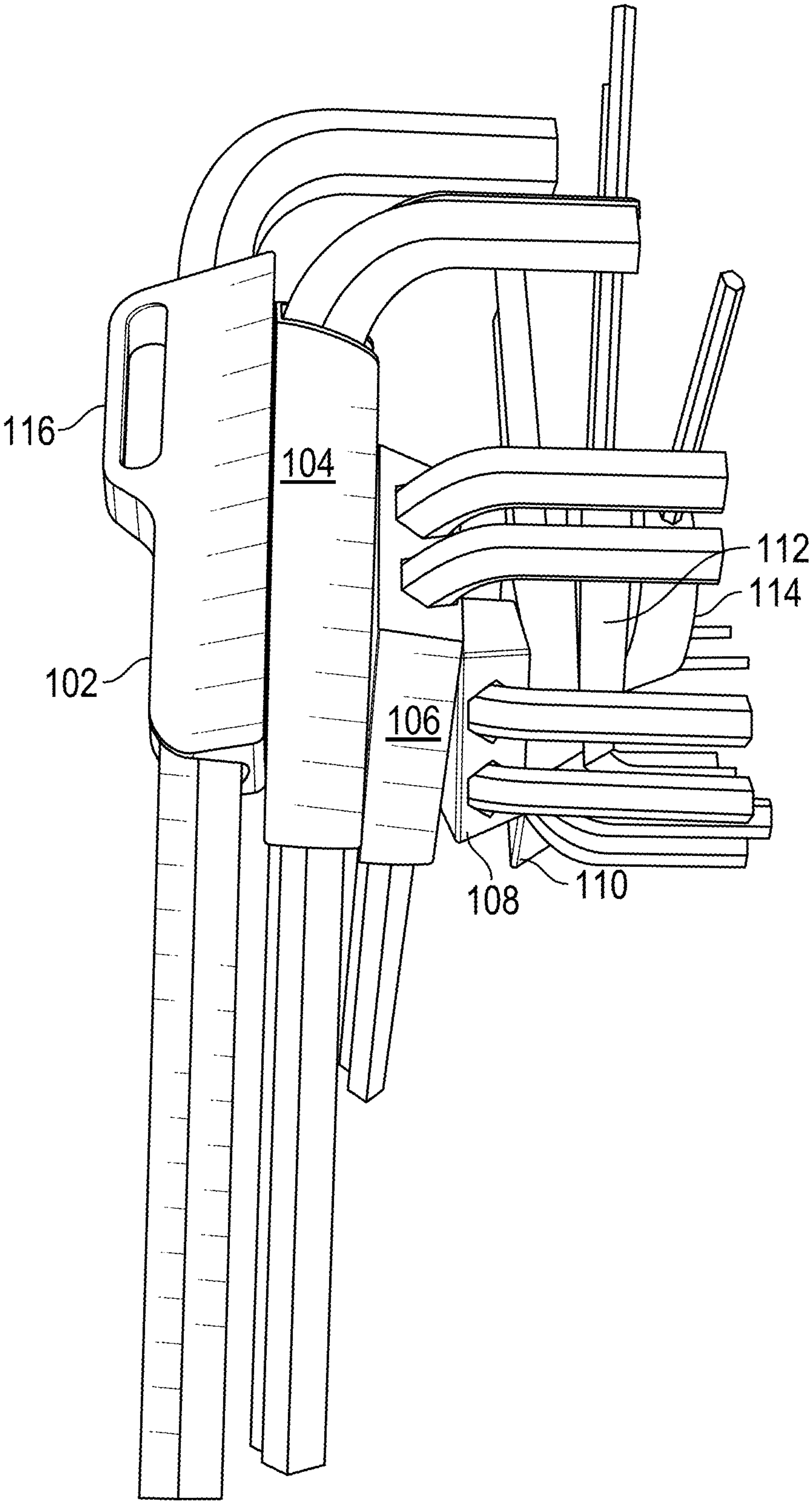
FIG. 7 illustrates a first example of the tool holder adjusted to allow the individual modules to rotate.

FIG. 7 illustrates a first example of the tool holder adjusted to allow the individual modules to rotate. As illustrated, the modules 102, 104, 106, 108, 110, 112, 114 have rotated such that (moving from the largest module 102 to the smallest module 114) each subsequent module is slightly rotated (approximately 45°) from the previous module, thereby allowing the tools sufficient space to be pulled (or pushed) from the respective modules. in other configurations the angle of rotation can be more or less than 45°, so long as there is sufficient room to remove tools.

Figure 8:
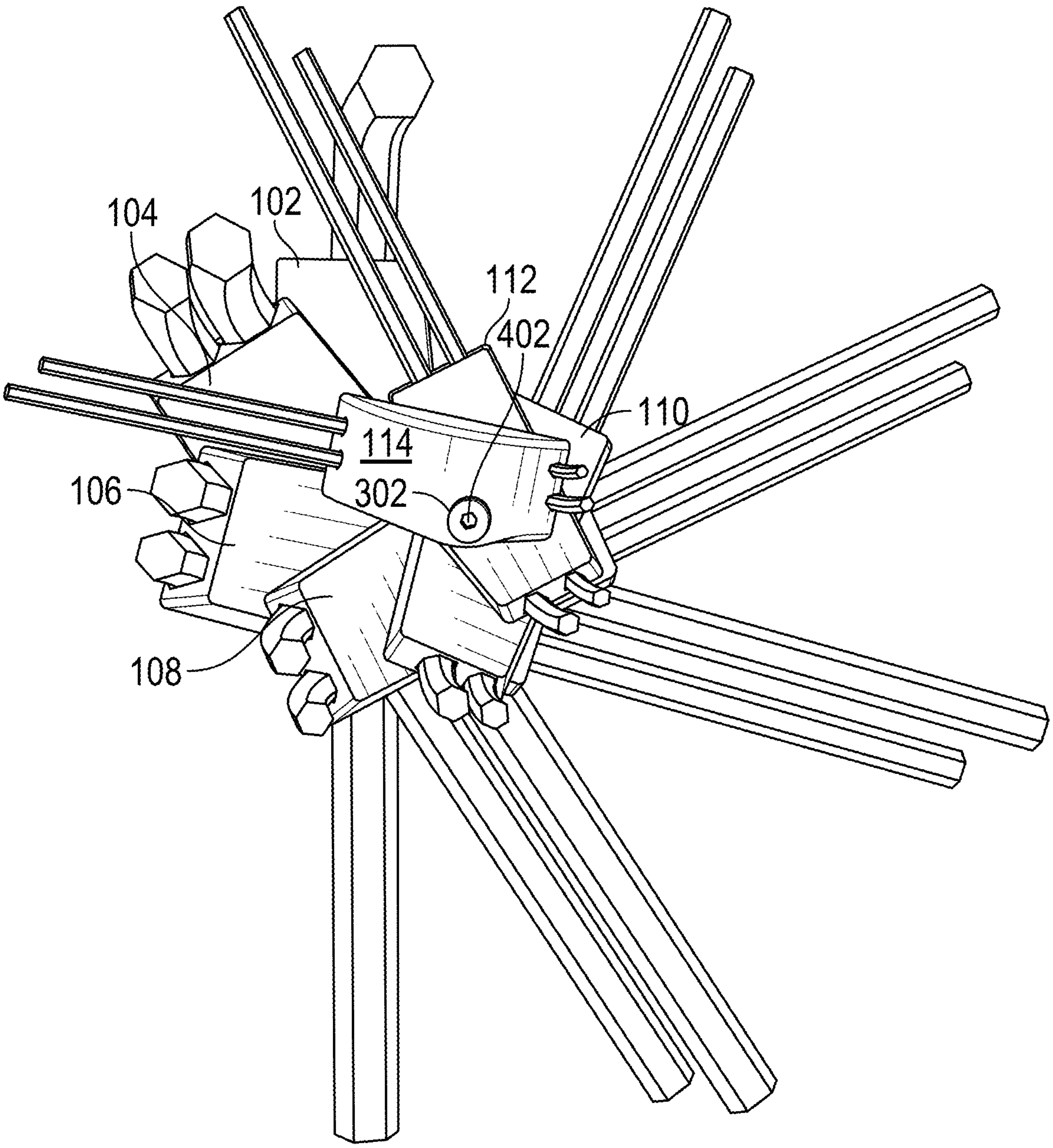
FIG. 8 illustrates a second example of the tool holder adjusted to allow the individual modules to rotate.

FIG. 8 illustrates a second example of the tool holder adjusted to allow the individual modules to rotate. As described with respect to FIG. 7, the individual modules 102, 104, 106, 108, 110, 112, 114 have been rotated, allowing a user to pull (or push) the tools free from their respective modules. From this perspective the bolt 304 is visible as is extends through the bolt hole 302 through each and every module.

Figure 9:
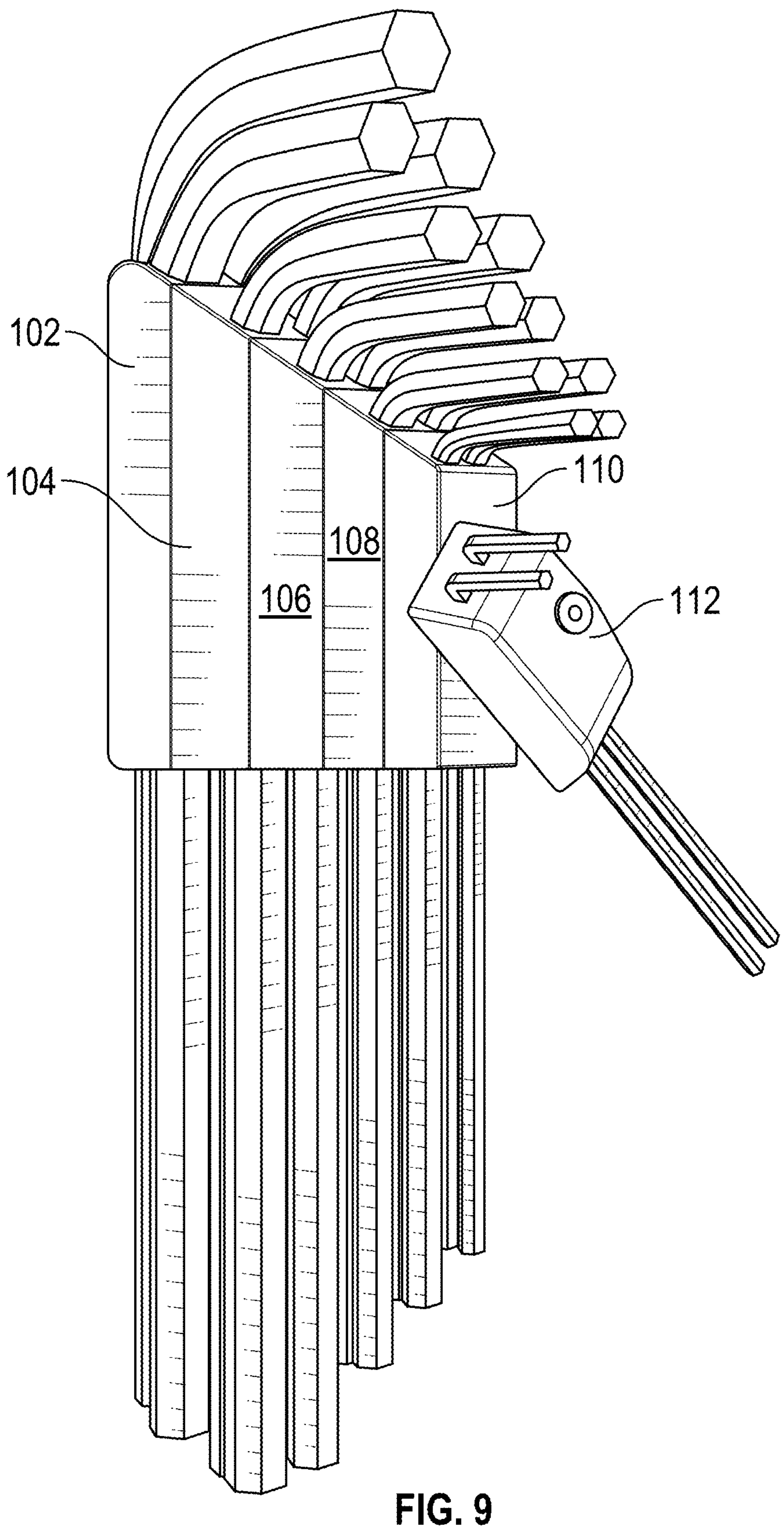
FIG. 9 illustrates an example of the tool holder with a single module turned to allow removal of tools.

FIG. 9 illustrates an example of the tool holder with a single module turned to allow removal of tools. As illustrated, only the smallest module 112 is rotated, allowing tools from the smallest module 112 to be removed. While in some configurations the tools of the largest module 102 can be removed without rotation (because there are not tools from other modules blocking removal from the largest module 102), the tools of modules 104, 106, 108, 110 as illustrated in FIG. 9 are not currently removable.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A tool holder, comprising: a first module defining at least one tool cavity configured to receive and hold a first tool positioned in a first direction until a user applies pressure to remove the first tool; a second module also defining at least one tool cavity configured to receive and hold a second tool positioned in the first direction until the user applies pressure to remove the second tool; and a position-control mechanism disposed at an interface between the first module and the second module, the position-control mechanism comprising: a protrusion on a side of the first module that is disposed in a mating cavity defined in a side of the second module adjacent thereto, wherein the mating cavity is shaped such that the protrusion may move within the mating cavity allowing the first module to rotate independently from the second module such that a tool disposed in the at least one tool cavity of the first module may be positioned in a second direction different than the first direction.

The tool holder of any preceding clause, wherein: the protrusion is a circular protrusion; and the mating cavity is an elliptical-like cavity.

The tool holder of any preceding clause, wherein: the elliptical-like cavity has vertices along a major axis of the elliptical-like cavity, a single co-vertex along a minor axis of the elliptical-like cavity, and a notch extending into the elliptical-like cavity along the minor axis in place of an additional co-vertex.

The tool holder of any preceding clause, wherein: when the first module is aligned with the second module, the first module is in a retaining configuration; and when the first module is not aligned with the second module, the first module is in a release configuration.

The tool holder of any preceding clause, wherein: when the first module is in the retaining configuration, the protrusion of the first module engages with the mating cavity of the second module, such that the circular protrusion fits into the elliptical-like cavity of the second module on a first side of the notch; and when the first module is in the release configuration, the protrusion of the first module couples with the mating cavity of the second module, such that the circular protrusion fits into the elliptical-like cavity of the second module on a second side of the notch.

The tool holder of any preceding clause, wherein torque, applied by a user to the first module and the second module, causes the circular protrusion of the first module to cantilever from the first side of the notch to the second side of the notch of the elliptical-like cavity of the second module.

The tool holder of any preceding clause, when the first module is in the release configuration, the first module is offset from the second module by a predefined angle.

The tool holder of any preceding clause, wherein the predefined angle is 45°.

The tool holder of any preceding clause, further comprising: a third module also defining at least one tool cavity configured to receive and hold a third tool positioned in the first direction until the user applies pressure to remove the third tool; and an additional position-control mechanism disposed at an additional interface between the second and third modules, the position-control mechanism comprising: a protrusion on a second side of the second module that is disposed in a mating cavity defined in a side of the third module adjacent thereto.

The tool holder of any preceding clause, wherein the third module is larger than the second module which is larger than the first module.

The tool holder of any preceding clause, wherein: the first module, the second module, and the third module are at least part of a plurality of modules, each module in the plurality of modules being of different sizes, such that the plurality of modules are arranged from a largest module to a smallest module.

The tool holder of any preceding clause, wherein: the first module and the second module each comprise a bolt hole; and the first module and the second module are secured together with a bolt extending through the bolt hole of the first module and the second module.

The tool holder of any preceding clause, wherein the first tool and the second tool are one of a hex key or an Allen wrench.

A tool holder, comprising: a first module defining at least one tool cavity configured to receive and hold a first tool positioned in a first direction until a user applies pressure to remove the first tool; a second module also defining at least one tool cavity configured to receive and hold a second tool positioned in the first direction until the user applies pressure to remove the second tool; and a position-control mechanism disposed at an interface between the first module and the second module, the position-control mechanism comprising: a circular protrusion on a side of the first module that is disposed in a mating cavity defined in a side of the second module adjacent thereto, wherein the mating cavity is an elliptical-like cavity shaped such that the circular protrusion may move within the mating cavity allowing the first module to rotate independently from the second module such that a tool disposed in the at least one tool cavity of the first module may be positioned in a second direction different than the first direction.

The tool holder of any preceding clause, wherein: the elliptical-like cavity has vertices along a major axis of the elliptical-like cavity, a single co-vertex along a minor axis of the elliptical-like cavity, and a notch extending into the elliptical-like cavity along the minor axis in place of an additional co-vertex.

The tool holder of any preceding clause, wherein: when the first module is aligned with the second module, the first module is in a retaining configuration; and when the first module is not aligned with the second module, the first module is in a release configuration.

The tool holder of any preceding clause, wherein: when the first module is in the retaining configuration, the circular protrusion of the first module engages with the mating cavity of the second module, such that the circular protrusion fits into the elliptical-like cavity of the second module on a first side of the notch; and when the first module is in the release configuration, the circular protrusion of the first module couples with the mating cavity of the second module, such that the circular protrusion fits into the elliptical-like cavity of the second module on a second side of the notch.

The tool holder of any preceding clause, wherein torque, applied by a user to the first module and the second module, causes the circular protrusion of the first module to cantilever from the first side of the notch to the second side of the notch of the elliptical-like cavity of the second module.

The tool holder of any preceding clause, when the first module is in the release configuration, the first module is offset from the second module by a predefined angle.

A tool holder, comprising: a first module defining at least one tool cavity configured to receive and hold a first tool positioned in a first direction until a user applies pressure to remove the first tool; a second module also defining at least one tool cavity configured to receive and hold a second tool positioned in the first direction until the user applies pressure to remove the second tool; a third module also defining at least one tool cavity configured to receive and hold a third tool positioned in the first direction until the user applies pressure to remove the third tool, the first module, the second module, and the third module being connected via position-control mechanisms disposed at an interface between each module and a neighboring module, the position-control mechanisms comprising: a protrusion on a side of the each module that is disposed in a mating cavity defined in a side of the neighboring module adjacent thereto, wherein the mating cavity is shaped such that the protrusion may move within the mating cavity allowing the each module to rotate independently from the neighboring module such that a tool disposed in the at least one tool cavity of the each module may be positioned in a second direction different than the first direction.

I claim:

1. A tool holder, comprising:

a first module defining at least one tool cavity configured to receive and hold a first tool positioned in a first direction until a user applies pressure to remove the first tool;

a second module also defining at least one tool cavity configured to receive and hold a second tool positioned in the first direction until the user applies pressure to remove the second tool; and a first position-control mechanism disposed at an interface between the first module and the second module, the first position-control mechanism comprising a protrusion on a side of the first module that is disposed in a mating cavity defined in a side of the second module adjacent thereto, wherein the mating cavity is shaped such that the protrusion may move within the mating cavity allowing the first module to rotate independently from the second module such that a tool disposed in the at least one tool cavity of the first module may be positioned in a second direction different than the first direction, and wherein the mating cavity has vertices along a major axis thereof, a single co-vertex along a minor axis thereof, and a notch extending into the mating cavity along the minor axis in place of an additional co-vertex.

2. The tool holder of claim 1, wherein:

the protrusion is a circular protrusion; and the mating cavity controls an angle to which the second module turns.

3. The tool holder of claim 1, wherein:

the first module is in a retaining configuration when the first module is aligned with the second module; and the first module is in a release configuration when the first module is not aligned with the second module.

4. The tool holder of claim 3, wherein:

when the first module is in the retaining configuration, the protrusion of the first module engages with the mating cavity of the second module, such that the circular protrusion fits into the mating cavity of the second module on a first side of the notch; and when the first module is in the release configuration, the protrusion of the first module couples with the mating cavity of the second module, such that the circular protrusion fits into the mating cavity of the second module on a second side of the notch.

5. The tool holder of claim 4, wherein torque, applied by a user to the first module and the second module, causes the circular protrusion of the first module to cantilever from the first side of the notch to the second side of the notch of the mating cavity of the second module.

6. The tool holder of claim 3, wherein the first module is offset from the second module by a predefined angle when the first module is in the release configuration.

7. The tool holder of claim 6, wherein the predefined angle is 45°.

8. The tool holder of claim 1, further comprising:

a third module also defining at least one tool cavity configured to receive and hold a third tool positioned in the first direction until the user applies pressure to remove the third tool; and a second position-control mechanism disposed at an additional interface between the second module and the third module, the second position-control mechanism comprising a protrusion on a second side of the second module that is disposed in a second mating cavity defined in a side of the third module adjacent thereto.

9. The tool holder of claim 8, wherein the third module is larger than the second module which is larger than the first module.

10. The tool holder of claim 8, wherein:

the first module, the second module, and the third module are at least part of a plurality of modules, each module in the plurality of modules being of different sizes in which the plurality of modules are arranged from a largest module to a smallest module.

11. The tool holder of claim 1, wherein:

the first module and the second module each comprise a bolt hole; and the first module and the second module are secured together with a bolt extending through the bolt hole of the first module and the second module.

12. A tool holder, comprising:

a first module defining at least one tool cavity configured to receive and hold a first tool positioned in a first direction until a user applies pressure to remove the first tool;

a second module also defining at least one tool cavity configured to receive and hold a second tool positioned in the first direction until the user applies pressure to remove the second tool; and a position-control mechanism disposed at an interface between the first module and the second module, the position-control mechanism comprising a circular protrusion on a side of the first module that is disposed in a mating cavity defined in a side of the second module adjacent thereto, wherein the mating cavity is shaped such that the circular protrusion may move within the mating cavity allowing the first module to rotate independently from the second module such that a tool disposed in the at least one tool cavity of the first module may be positioned in a second direction different than the first direction, and wherein the mating cavity has vertices along a major axis thereof, a single co-vertex along a minor axis thereof, and a notch extending into the mating cavity along the minor axis in place of an additional co-vertex.

13. The tool holder of claim 12, wherein:

the first module is in a retaining configuration when the first module is aligned with the second module; and the first module is in a release configuration when the first module is not aligned with the second module.

14. The tool holder of claim 13, wherein:

when the first module is in the retaining configuration, the circular protrusion of the first module engages with the mating cavity of the second module, such that the circular protrusion fits into the mating cavity of the second module on a first side of the notch; and when the first module is in the release configuration, the circular protrusion of the first module couples with the mating cavity of the second module, such that the circular protrusion fits into the mating cavity of the second module on a second side of the notch.

15. The tool holder of claim 14, wherein torque, applied by a user to the first module and the second module, causes the circular protrusion of the first module to cantilever from the first side of the notch to the second side of the notch of the mating cavity of the second module.

16. The tool holder of claim 13, wherein the first module is offset from the second module by a predefined angle when the first module is in the release configuration.

17. A tool holder, comprising:

a first module defining at least one tool cavity configured to receive and hold a first tool positioned in a first direction until a user applies pressure to remove the first tool;

a second module also defining at least one tool cavity configured to receive and hold a second tool positioned in the first direction until the user applies pressure to remove the second tool;

a third module also defining at least one tool cavity configured to receive and hold a third tool positioned in the first direction until the user applies pressure to remove the third tool; and position-control mechanisms disposed at an interface between neighboring modules to connect the first module, the second module, and the third module, each position-control mechanism in the position-control mechanisms comprising a protrusion on a side of the each module that is disposed in a mating cavity defined in a side of the neighboring module adjacent thereto, wherein the mating cavity is shaped such that the protrusion may move within the mating cavity allowing the each module to rotate independently from the neighboring module such that a tool disposed in the at least one tool cavity of the each module may be positioned in a second direction different than the first direction, and wherein the mating cavity has vertices along a major axis thereof, a single co-vertex along a minor axis thereof, and a notch extending into the mating cavity along the minor axis in place of an additional co-vertex.

* * * * *